(12) United States Patent
Sarkar et al.

(10) Patent No.: US 9,851,906 B2
(45) Date of Patent: Dec. 26, 2017

(54) VIRTUAL MACHINE DATA PLACEMENT IN A VIRTUALIZED COMPUTING ENVIRONMENT

(71) Applicant: VMWARE, INC., Palo Alto, CA (US)

(72) Inventors: Prasenjit Sarkar, Bangalore (IN);
Rishi Kant Sharda, Bangalore (IN);
Vineet Kumar Sinha, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 61 days.

(21) Appl. No.: 14/886,000

(22) Filed: Oct. 17, 2015

(65) Prior Publication Data

US 2016/0371020 A1 Dec. 22, 2016

(30) Foreign Application Priority Data

Jun. 16, 2015 (IN) .......................... 3014/CHE/2015

(51) Int. Cl.
| | | |
|---|---|---|
| *G06F 12/00* | (2006.01) | |
| *G06F 3/06* | (2006.01) | |
| *G06F 12/02* | (2006.01) | |
| *G06F 12/08* | (2016.01) | |
| *G06F 12/109* | (2016.01) | |
| *G06F 13/24* | (2006.01) | |
| *G06F 12/1036* | (2016.01) | |

(52) U.S. Cl.
CPC ............ *G06F 3/0617* (2013.01); *G06F 3/065* (2013.01); *G06F 3/067* (2013.01); *G06F 12/0292* (2013.01); *G06F 12/08* (2013.01); *G06F 12/109* (2013.01); *G06F 12/1036* (2013.01); *G06F 13/24* (2013.01)

(58) Field of Classification Search
CPC ........ G06F 3/0617; G06F 3/065; G06F 3/067; G06F 12/0292; G06F 12/08; G06F 12/1036; G06F 12/109; G06F 13/24
USPC .... 711/148, 150, 154, 203; 710/28, 33, 104, 710/266; 712/28, 225, 244; 714/25, 31, 714/42
See application file for complete search history.

(56) References Cited

U.S. PATENT DOCUMENTS

| | | | | |
|---|---|---|---|---|
| 7,149,847 | B2* | 12/2006 | Frey, Jr. .............. | G06F 11/1076 711/114 |
| 9,521,198 | B1* | 12/2016 | Agarwala .......... | G06F 12/0253 |
| 2012/0278801 | A1* | 11/2012 | Nelson ................ | G06F 9/45533 718/1 |
| 2013/0097120 | A1* | 4/2013 | Mummidi ......... | G06F 17/30289 707/649 |
| 2013/0097464 | A1* | 4/2013 | Ahmad ............... | G06F 9/45558 714/47.1 |

(Continued)

*Primary Examiner* — Reba I Elmore (57) ABSTRACT

An example method is provided for virtual machine data placement on a distributed storage system accessible by a cluster in a virtualized computing environment. The method may comprise, based on location data relating to the cluster, identifying a first fault domain and a second fault domain of the distributed storage system. The method may further comprise selecting a first host with a first storage resource from the first fault domain and a second host with a second storage resource from the second fault domain. The method may further comprise placing a first copy of the virtual machine data on the first storage resource and a second copy of the virtual machine data on the second storage resource.

20 Claims, 7 Drawing Sheets

(56) References Cited

U.S. PATENT DOCUMENTS

| | | | |
|---|---|---|---|
| 2013/0282670 A1* | 10/2013 | Fiske | G06F 17/30156 707/692 |
| 2014/0101298 A1* | 4/2014 | Shukla | H04L 41/5006 709/223 |
| 2015/0089272 A1* | 3/2015 | Nelson | G06F 9/45533 714/4.1 |
| 2015/0186215 A1* | 7/2015 | Das Sharma | G06F 11/1088 714/6.23 |
| 2016/0314051 A1* | 10/2016 | Joshi | G06F 11/2069 |

* cited by examiner

VIRTUAL MACHINE DATA PLACEMENT IN A VIRTUALIZED COMPUTING ENVIRONMENT

RELATED APPLICATIONS

Benefit is claimed under 35 U.S.C. 119(a)-(d) to Foreign application Serial No. 3014/CHE/2015 filed in India entitled "VIRTUAL MACHINE DATA PLACEMENT IN A VIRTUALIZED COMPUTING ENVIRONMENT", on Jun. 16, 2015, by VMware, Inc., which is herein incorporated in its entirety by reference for all purposes.

BACKGROUND

Unless otherwise indicated herein, the approaches described in this section are not admitted to be prior art by inclusion in this section.

Virtualization allows the abstraction of hardware resources and the pooling of these resources to support multiple virtual machines in a virtualized computing environment. For example, through virtualization, virtual machines running different operating systems may be supported by the same physical machine (e.g., referred to as a "host"). Each virtual machine is generally provisioned with virtual resources that provide similar functions as the physical hardware of the host, such as central processing unit (CPU) resources, memory resources, storage resources and network resources to run an operating system and applications.

Storage resources are required by a virtual machine to store data relating to the operating system and applications run by the virtual machine, etc. In a distributed storage system, storage resources of a cluster of hosts may be aggregated to form a single shared pool of storage. Virtual machines supported by the hosts within the cluster may then use the pool of storage to store data. However, storage disks of hosts that form the pool of storage are susceptible to failure, which may cause undesirable disruption to the operation of the virtual machines.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
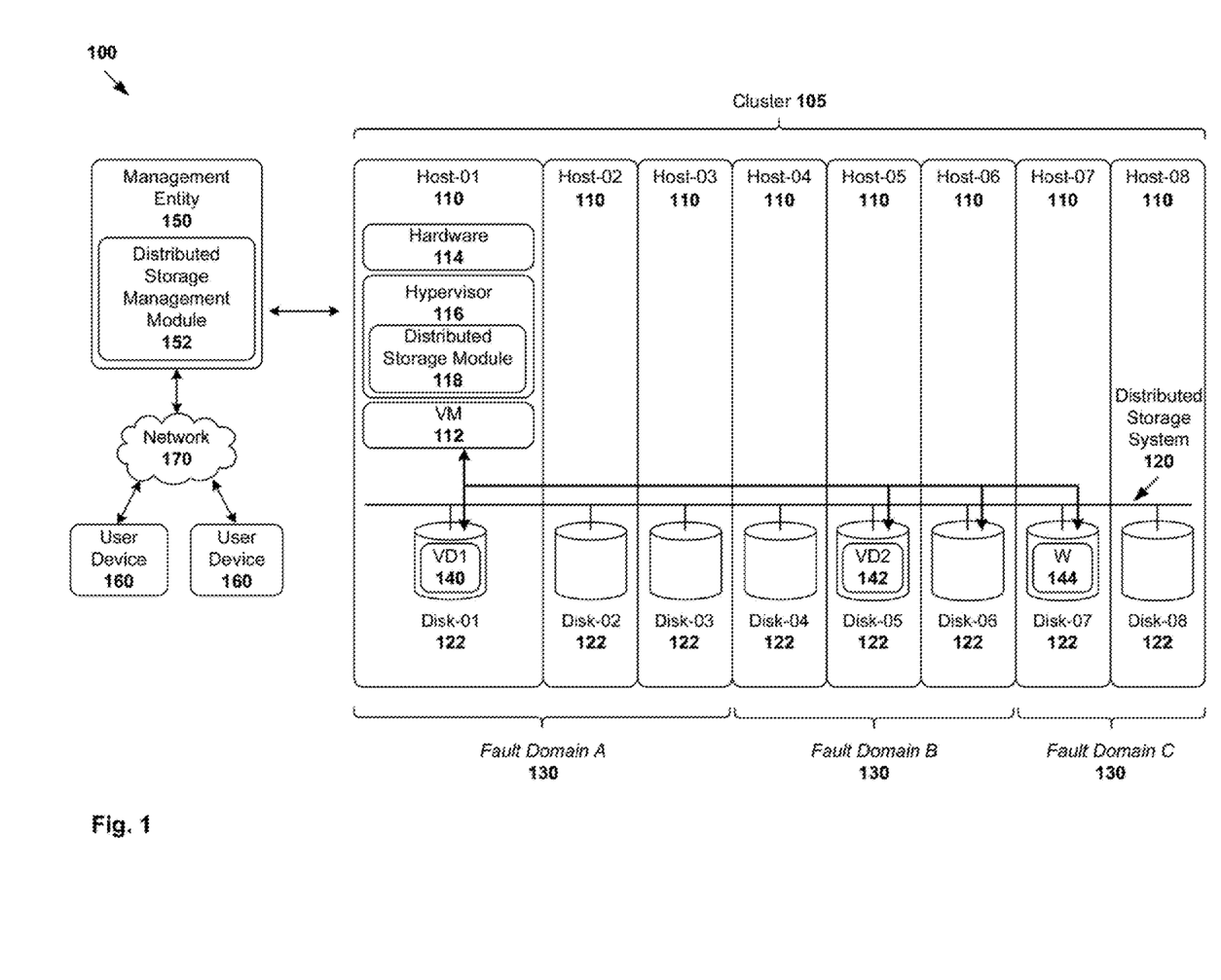
FIG. 1 is a schematic diagram illustrating an example virtualized computing environment that includes a distributed storage system.

The challenges of storage virtualization will now be further explained using FIG. 1, which is a schematic diagram illustrating example virtualized computing environment 100 that includes example distributed storage system 120. Although an example is shown, it should be understood that example virtualized computing environment 100 may include additional or alternative components, and may have a different configuration.

In the example in FIG. 1, virtualized computing environment 100 includes hosts 110 (also known as "host computers" or "physical servers") that support multiple virtual machines 112 (one shown for simplicity). Each host 110 may include suitable hardware 114 and execute virtualization software (e.g., hypervisor 116) to support virtual machines 112. Hypervisor 116 maintains a mapping between hardware 114 and virtual resources allocated to virtual machines 112, such as CPU resources (e.g., processors), memory resources (e.g., random access memory), storage resources 122 (e.g., storage disks) and network resources (e.g., access networks).

In virtualized computing environment 100, cluster 105 of hosts 110 may aggregate their storage resources 122 to form distributed storage system 120 that represents a shared pool of storage. For example in FIG. 1, cluster 105 is formed by eight hosts 110 labelled "Host-01", "Host-02", "Host-03", "Host-04", "Host-05", "Host-06", "Host-07" and "Host-08." Distributed storage system 120 aggregates storage resources 122 of hosts 110, such as storage disks labelled "Disk-01" of "Host-01", "Disk-02" of "Host-02", "Disk-03" of "Host-03", and so on. When aggregated, storage resources 122 (e.g., "Disk-01" to "Disk-08") of as distributed storage system 120 may be used to store data relating to virtual machines 112 running on hosts 110 within cluster 105.

Throughout the present disclosure, the term "storage resource" 122 may generally refer to any suitable physical storage that is local (e.g., internal storage) or connected to corresponding host 110. For example, suitable storage resource 122 may include hard disk drive (HOD), solid-state drive (SSD), peripheral component interconnect (PCI) based flash storage, serial advanced technology attachment (SATA) storage controller, serial attached small computer system interface (SAS) storage controller, etc. Storage resource 122 may represent one disk, or a disk group with multiple disks.

In practice, storage resource 122 may be one or more disk groups, each having at least one cache device (e.g., SDD) for read caching and write buffering and at least one capacity device (e.g., HDD) for persistent data storage, etc. In practice, a cache device may be mapped to multiple capacity devices. Flash devices may also be used. Although the example in FIG. 1 shows each host 110 contributing storage resource 122 to distributed storage system 120, there may be hosts 110 that are without any storage resource 122 within cluster 105 based on the desired implementation.

In practice, distributed storage system 120 may also be known as a "Virtual Storage Area Network" (Virtual SAN)

representing a logical container that hides specifics of storage resources 122 from virtual machines 112. Distributed storage system 120 may use any disk format, such as virtual machine file system leaf level (VMFS-L), Virtual SAN on-disk file system (VSAN FS), etc. Cluster 105 may include any suitable number of hosts 110, such as between 3 and 64, etc. To manage distributed storage system 120, each host 110 may execute "distributed storage module" 118 (e.g., a "Virtual SAN kernel module") to perform various functionalities.

A corresponding "distributed storage management module" 152 may be run on management entity 150 to manage distributed storage system 120. Users operating remote user devices 160 may also access management functionalities of management entity 150 via network 170, such as to create or update cluster 105, etc. In practice, management entity 150 may be implemented by one or more virtual or physical entities, and provide other management functionalities for managing other objects (e.g., hosts 110, virtual machines 112, etc.). User device 160 may be any suitable computing device, such as a user workstation, client device, mobile device, etc.

One aspect of storage management by distributed storage module 118 or distributed storage management module 152 is known as "data placement" or "virtual machine data placement". The terms refer generally to a process of determining which storage resource 122 to store data relating to virtual machine 112. Virtual machine data placement is usually performed during the provisioning of a new virtual machine 112 or when additional storage is allocated to an existing virtual machine 112.

Conventionally, virtual machine data placement involves selecting storage resources 122 contributed by different hosts 110 to place multiple copies of virtual machine data on distributed storage system 120. For example in FIG. 1, a first copy may be placed on "Disk-01" of "Host-01", its replica or second copy on "Disk-02" of "Host-02". The aim is to, in the event of a failure at "Host-01" and "Disk-01" access the second copy on "Disk-02" of "Host-02" to keep virtual machine 112 running.

However, the above implementation relies heavily on the assumption that all hosts 110 within cluster 105 operate independently of each other. In practice, this assumption is not always valid, such as when a single fault affects both "Host-01" and "Host-02", or corresponding "Disk-01" and "Disk-02", simultaneously. In this case, both copies of the virtual machine data would be unavailable.

Fault Domain Awareness

According to examples of the present disclosure, virtual machine data placement may be implemented based on fault domain awareness to improve fault tolerance of distributed storage system 120. Here, the term "fault domain" 130 may generally refer to logical boundaries or zone within which a fault may affect one or more hosts 110 in cluster 105. For example, a fault may occur when storage resource 122 fails (e.g., failure of a capacity device, cache device, storage controller, etc.), network failure, host failure, power failure, etc.

To identify different fault domains 130, fault domain identification may be performed for distributed storage system 120. In the example in FIG. 1, three fault domains may be identified. "Fault Domain A" may be identified to include "Host-01" with "Disk-01", "Host-02" with "Disk-02" and "Host-03" with "Disk-03"; "Fault Domain B" to include "Host-04" with "Disk-04", "Host-05 with "Disk-05"" and "Host-06" with "Disk-06" and "Fault Domain C" to include "Host-07" with "Disk-07" and "Host-08" with "Disk-08".

Following fault domain identification, virtual machine data placement may be performed with "fault domain awareness" to place copies of virtual machine data in different fault domains 130. In the example in FIG. 1, first copy 140 of virtual machine data labelled "VD1" may be placed on "Disk-01" of "Host-01" in "Fault Domain A", and second copy 142 labelled "VD2" on "Disk-05" of "Host-05" in "Fault Domain B". This placement isolates "VD1" in "Fault Domain A" from "VD2" in "Fault Domain B" to reduce the likelihood of both copies failing simultaneously to improve the resiliency of distributed storage system 120.

Figure 2:
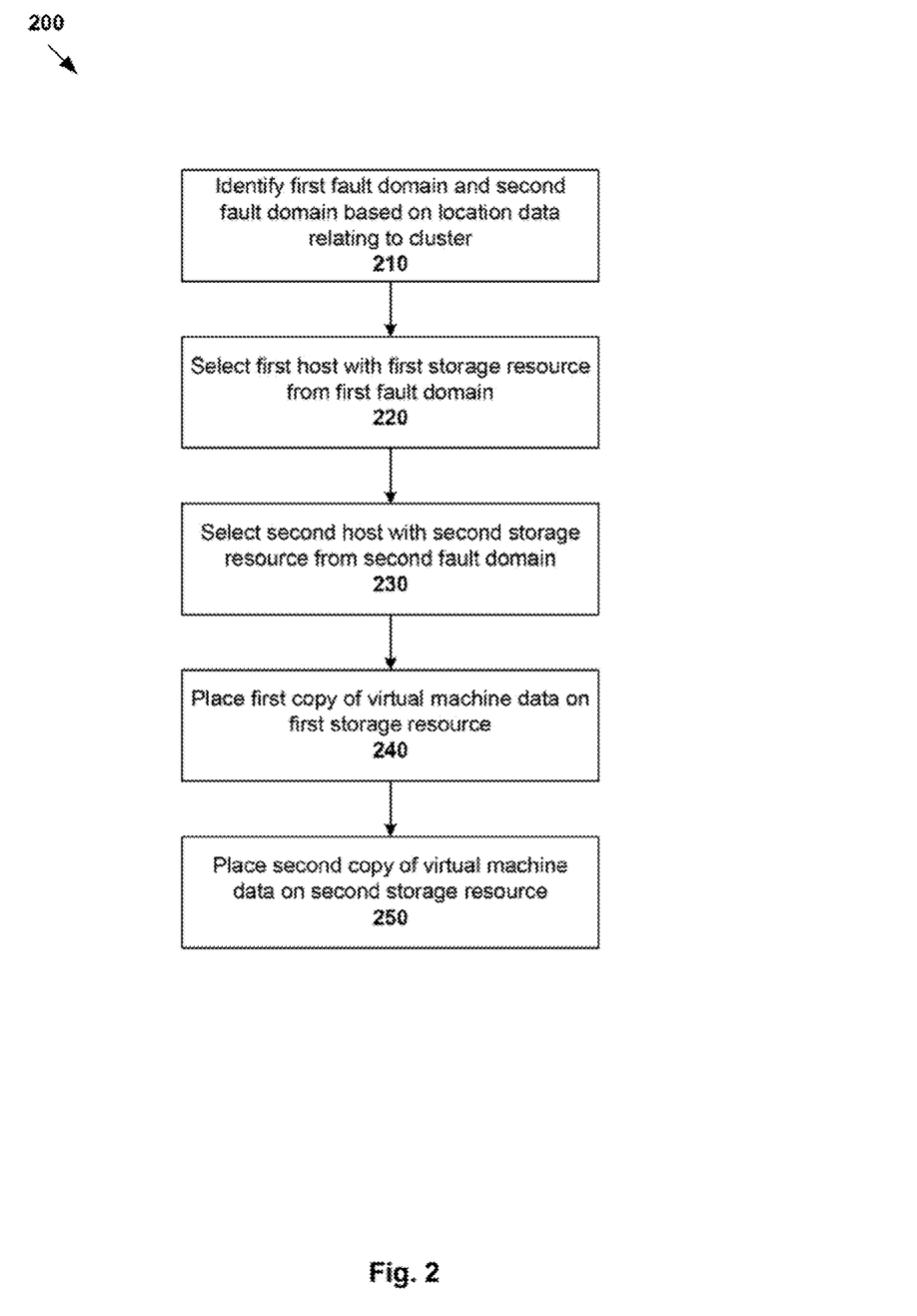
FIG. 2 is a flowchart of an example process for virtual machine data placement on a distributed storage system accessible by a cluster in a virtualized computing environment.

In more detail, FIG. 2 is a flowchart of example process 200 for virtual machine data placement on distributed storage system 120 accessible by cluster 105 in virtualized computing environment 100. Example process 200 may include one or more operations, functions, or actions illustrated by one or more blocks, such as blocks 210 to 250. The various blocks may be combined into fewer blocks, divided into additional blocks, and/or eliminated based upon the desired implementation.

In practice, example process 200 may be performed using any suitable computing system in virtualized computing environment 100, such as host 110 (e.g., distributed storage module 118), management entity 150 (e.g., distributed storage management module 152), a combination of host 110 and management entity 150, or any alternative or additional component, etc.

At block 210, based on location data relating to cluster 105, fault domains 130 of distributed storage system are identified. In particular, first fault domain 130 (e.g., "Fault Domain A") and second fault domain 130 (e.g., "Fault Domain B") may be identified.

The location data may include data relating to a physical location of hosts 110 in cluster 105. For example, the location data may be used to determine the physical location of host 110 in the form of a chassis, rack, pod, datacenter, room, floor, building, any combination thereof, etc. As will be explained using FIG. 3, any suitable location data may be used, such as name data (see 310), tag data (see 320) of hosts 110, etc. Further, as will be explained using FIG. 4, the physical location of hosts 110 in cluster 105 may be represented using a tree structure.

At block 220, first host 10 with first storage resource 122 (e.g., "Host-01" with "Disk-01") is selected from first fault domain 130 (e.g., "Fault Domain A"). At block 230, second host 110 with second storage resource 122 (e.g., "Host-05" with "Disk-05") is selected from the second fault domain (e.g., "Fault Domain B"). The host selection may be performed based on any performance requirement (e.g., round trip time, latency, distance, etc.), such as to minimize the distance between first host 110 and second host 110 to improve performance.

At block 240, a first copy of the virtual machine data (e.g., "VD1" 140) is placed on first storage resource 122 (e.g., "Disk-01" of "Host-01"). At block 250, a second copy of the virtual machine data (e.g., "VD2" 140) is placed on second storage resource 122 (e.g., "Disk-02" of "Host-02").

According to example process 200, first 140 and second 142 copies may be placed in different fault domains 130 identified from the location data relating to cluster 105. Using the example in FIG. 1, "Fault Domain A" may represent a first pod housing "Host-01", "Host-02" and "Host-03", and "Fault Domain B" a second pod housing "Host-04", "Host-05" and "Host-06". When "Fault Domain A" fails and first copy 140 (e.g., "VD1" on "Disk-01") is inaccessible, second copy of virtual machine data 142 (e.g., "VD2" on "Disk-02") may be accessed from "Fault Domain B".

Since hosts 110 that are adjacent to each other may have a greater likelihood of being affected by the same failure (e.g., power disruption to hosts 110 within the same pod, etc.), the example process 200 may take into account where each host 110 is located or housed when identifying fault domains 130. In some implementations, the location data relating to cluster 105 also allows fault domain identification to adapt to any changes in the underlying physical location of hosts 110. For example, if the physical location of "Host-04" in FIG. 4 changes, it may be assigned to a different fault domain 130 (e.g., "Fault Domain C". This flexibility further improves the fault tolerance and resiliency of distributed storage system 120.

The virtual machine data placement may include placing any suitable data relating to virtual machine 112 on distributed storage system 120. This may include virtual machine home objects, swap objects, virtual disk, snapshots, memory, etc. In practice, a directory may be created to store the virtual machine data (e.g., .vmx, .vswp, .nvram files, etc.). A virtual disk may be used to store virtual machine data required by a guest operating system and applications running on virtual machine 112. Here, the term "virtual disk" may refer generally to files on a file system that appear as a single logical hard disk to the guest operating system.

In the following examples, first copy 140 (e.g., "VD1") may represent a first virtual disk, and second copy 142 (e.g., "VD2") a second virtual disk that is a replica of the first virtual disk. When first copy 140 is inaccessible, second copy 142 may be retrieved such that virtual machine 112 may continue its operation (e.g., after migration to another host 110). In practice, any suitable virtual disk may be used, such as a virtual machine disk (VMDK), etc.

Various examples of virtual machine data placement 200 according to FIG. 2 will now be described in more detail using FIG. 3 to FIG. 7. In particular, example location data will be explained using FIG. 3, example fault domain identification using FIG. 4, virtual machine data placement based on a data placement policy using FIG. 5 and FIG. 6, and example computing system using FIG. 7.

Location Data

Figure 3:
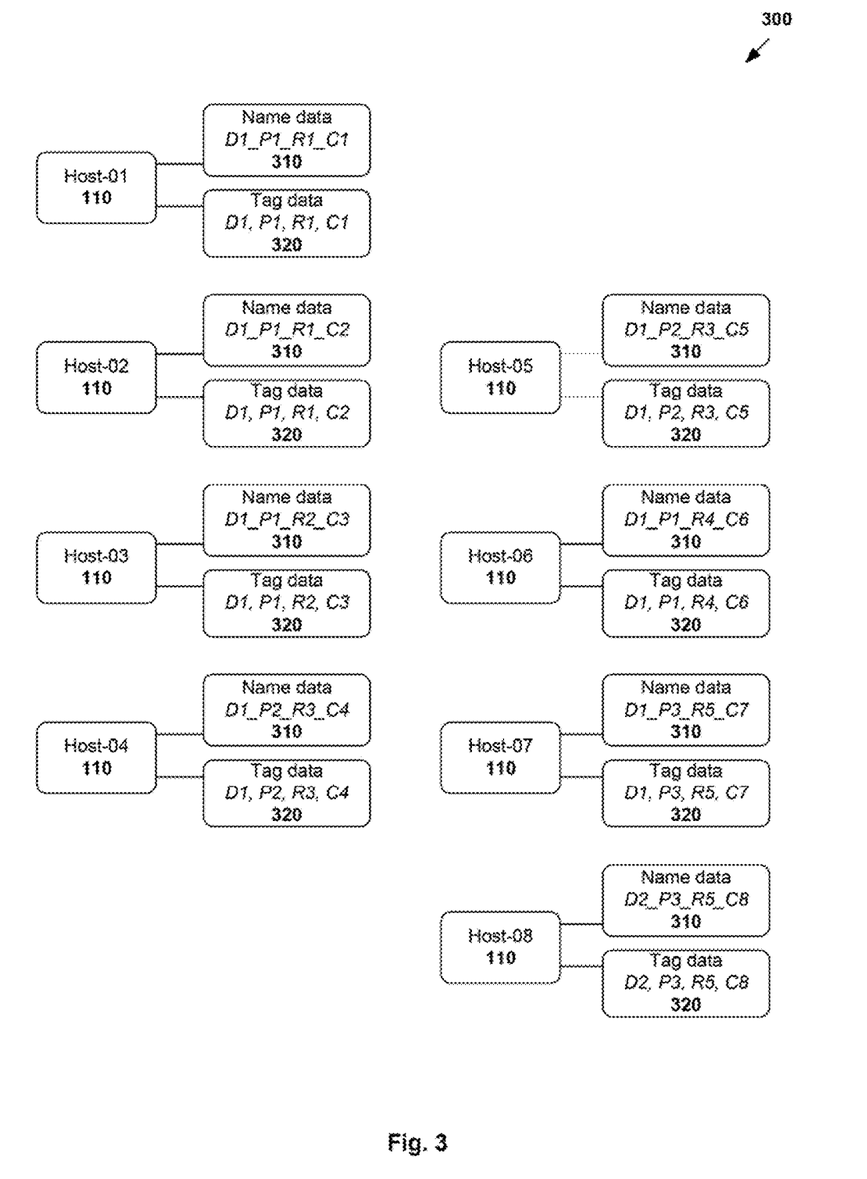
FIG. 3 is a schematic diagram illustrating example location data relating to a cluster in a virtualized computing environment.

FIG. 3 is a schematic diagram illustrating example location data 300 relating to cluster 105 in virtualized computing environment 100. Although an example is shown, it will be appreciated that location data 300 may include any additional or alternative data from which the physical location of hosts 110 of cluster 105 may be determined.

Location data 300 in FIG. 3 includes name data 310 of hosts 110 of cluster 105. Alternatively or additionally, tag data 320 of hosts 110 of cluster 105 may be used for fault domain identification. Name data 310 and/or tag data 320 may be provided when cluster 105 is created or updated. In practice, distributed storage management module 152 may receive name data 310 and/or tag data 320 from user device 160 via network 170. The user, who may be a system architect or administrator, generally knows where hosts 110 are located or housed in order to provide such location data 300.

In the example in FIG. 3, name data 310 and tag data 320 may identify a datacentre, a pod, a rack and a chassis associated with host 110. In general, a chassis may refer to an enclosure in which one or more hosts 110 may be mounted (e.g., depending on the vendor's specification). A rack (e.g., server rack) may include one or more chassis stacked to make efficient use of space and position within a pod. A pod may be a modular unit of datacenter with a set of resources or infrastructure to service one or more racks. A datacenter may be a collection of one or more hosts 110 housed in one or more chassis, racks and pods. Cluster 105 may in turn include one or more datacenters, which may be at a single location or geographically dispersed over different locations.

Name data 310 may include a name for each host 110 that follows a naming convention, such as "D#_P#_R#_C#", where "#" may be any suitable identifier (e.g., alphanumeric character, etc.). In particular, "D#" represents an identifier for a datacenter, "P#" an identifier for a pod, "R#" an identifier for a rack and "C#" an identifier for a chassis. For "Host-01" in the example in FIG. 1, "D1_P1_R1_C1" indicates that "Host-01" is located at "Datacenter 1" (D1), "Pod 1" (P1), "Rack 1" (R1) and "Chassis 1" (C1). For "Host-05", "D1_P2_R3_C5" indicates that "Host-05" is located at "Datacenter 1" (D1), "Pod 2" (P2), "Rack 3" (R3) and "Chassis 5" (C5).

Tag data 320 may include one or more tag categories and corresponding tag values, such as datacenter tag "D#", pod tag "P#", rack tag "R#" and chassis tag "C#". Similarly, "#" may be any suitable identifier (e.g., alphanumeric character, etc.). In practice, management entity 150 generally supports creation of tag categories by users operating user devices 160. For example, tag categories "datacenter tag", "pod tag", "rack tag" and "chassis tag" may be created and assigned to hosts 110 when cluster 105 is created or updated. For "Host 1" in FIG. 1, tag data 320 includes tag values "D1", "P1", "R1" and "C1" to indicate that "Host-01" is located at "Datacenter 1" (D1), "Pod 1" (P1), "Rack 1" (R1) and "Chassis 1" (C1). For "Host-05", tag data 320 includes "D1", "P2", "R3" and "C5" to indicate that "Host-05" is located at "Datacenter 1" (D1), "Pod 2" (P2), "Rack 3" (R3) and "Chassis 5" (C5).

Although some examples are shown in FIG. 3, name data 310 and/or tag data 320 may include other data relating to the physical location of hosts 110, such as a building, floor or room where the pod, rack and chassis are located, a network or network device to which host 110 is connected, etc. Name data 310 and/or tag data 320 may be updated easily as the physical or logical configuration of hosts 110 changes.

Management entity 150 may store name data 310 and/or tag data 320 on any suitable storage (e.g., on distributed storage system 120) for later retrieval. For example, hosts 110 may obtain data 310/320 by retrieving data 310/320 from storage, or receiving data 310/320 from management entity 150 (e.g., via distributed storage management module 152).

Fault Domain Identification

Figure 4:
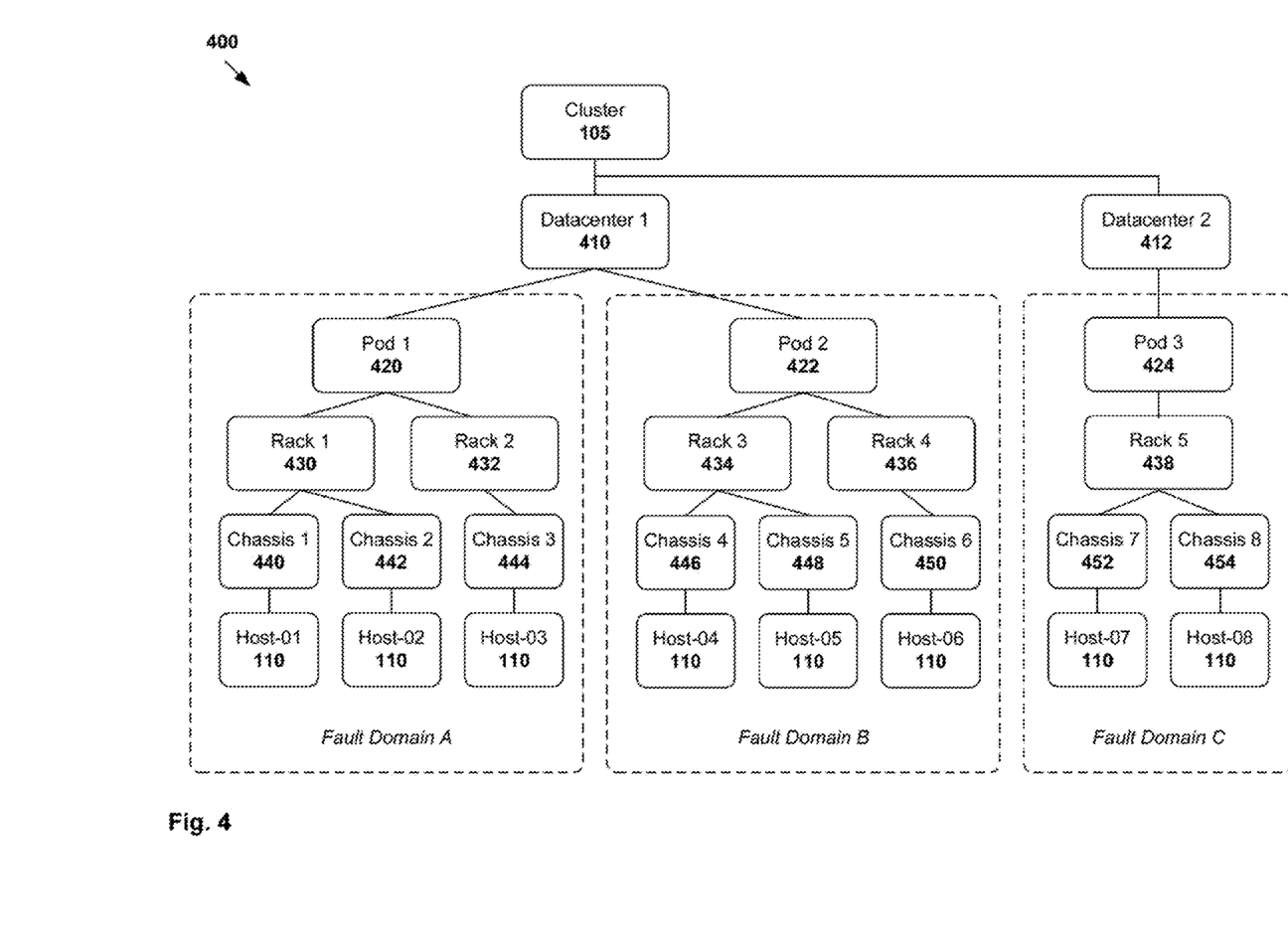
FIG. 4 is a schematic diagram illustrating example fault domain identification based on the example location data in FIG. 3.

FIG. 4 is a schematic diagram illustrating example fault domain identification 400 based on example location data 300 in FIG. 3. In particular, according to block 210 in FIG. 2, fault domain identification may be performed based on name data 310 and/or tag data 320 in FIG. 3. This may include determining a tree structure that represents the physical location of hosts 110 within a physical layout of cluster 105. For example in FIG. 4, "Host-01" is located at "Datacenter 1" (see 410), "Pod 1" (see 420), "Rack 1" (see 430) and "Chassis 1" (see 440). On the other hand, "Host-05" is located at "Datacenter 1" (see 410), "Pod 2" (see 422), "Rack 3" (see 434) and "Chassis 5" (see 448).

Based on the tree structure, fault domains 130 may be identified from different levels of granularity. At the datacenter level, "Host-01" to "Host-06" are located in "Datacenter 1" (see 410), while "Host-07" and "Host-08" in "Datacenter 2" (see 412). At the pod level, "Host-01" to "Host-03" are located in "Pod 1" (see 420), "Host-04" to "Host-06" in "Pod 2" (see 422) and "Host-07" to "Host-08" in "Pod 3" (see 424).

At the rack level, hosts 110 belong to "Rack 1" 430 (i.e., "Host-01" and "Host-02"), "Rack 2" 432 (i.e., "Host-03"), "Rack 3" 434 (i.e., "Host-04" and "Host-05"), "Rack 4" 436 (i.e., "Host-06") and "Rack 5" 438 (i.e., "Host-07" and "Host-08"). At the chassis level, "Host-01" to "Host-08" are mounted on different chassis "Chassis 1" to "Chassis 8" respectively (see 440, 442, 444, 446, 448, 450, 452, 454).

In the example in FIG. 4, the pod level may be used to identify three fault domains 130. In this case, "Fault Domain A" in FIG. 1 includes "Host-01" to "Host-03" housed within "Pod 1" (see 420); "Fault Domain B" includes "Host-04" to "Host-06" within "Pod 2" (see 422); and "Fault Domain C" includes "Host-04" to "Host-06" within "Pod 3" (see 424). The three different fault domains 130 may then be used for virtual machine data placement according to example process 200.

In practice, fault domain identification may be performed at any suitable level of granularity in the tree structure depending on the desired implementation. For example, different fault domains 130 may be identified at the datacentre level (e.g., two larger fault domains 130 for "Datacenter 1" and "Datacenter 2"); rack level (e.g., five smaller fault domains 130 for "Rack 1" to "Rack 5"); and chassis level (e.g., eight smaller fault domains 130).

The level of granularity of fault domain identification may be configurable, manually (e.g., by users) or automatically (e.g., by management entity 150 or hosts 110). This flexibility allows fault domains 130 to be identified according to user requirements, changes in the physical location of hosts 110, real-time performance requirements, etc. For example, if "Host-04" is detected to have moved from "Pod 2" (see 422) to "Pod 3" (see 424), its fault domain 130 may be updated from "Fault Domain B" to "Fault Domain C".

Data Placement Policy

Figure 5:
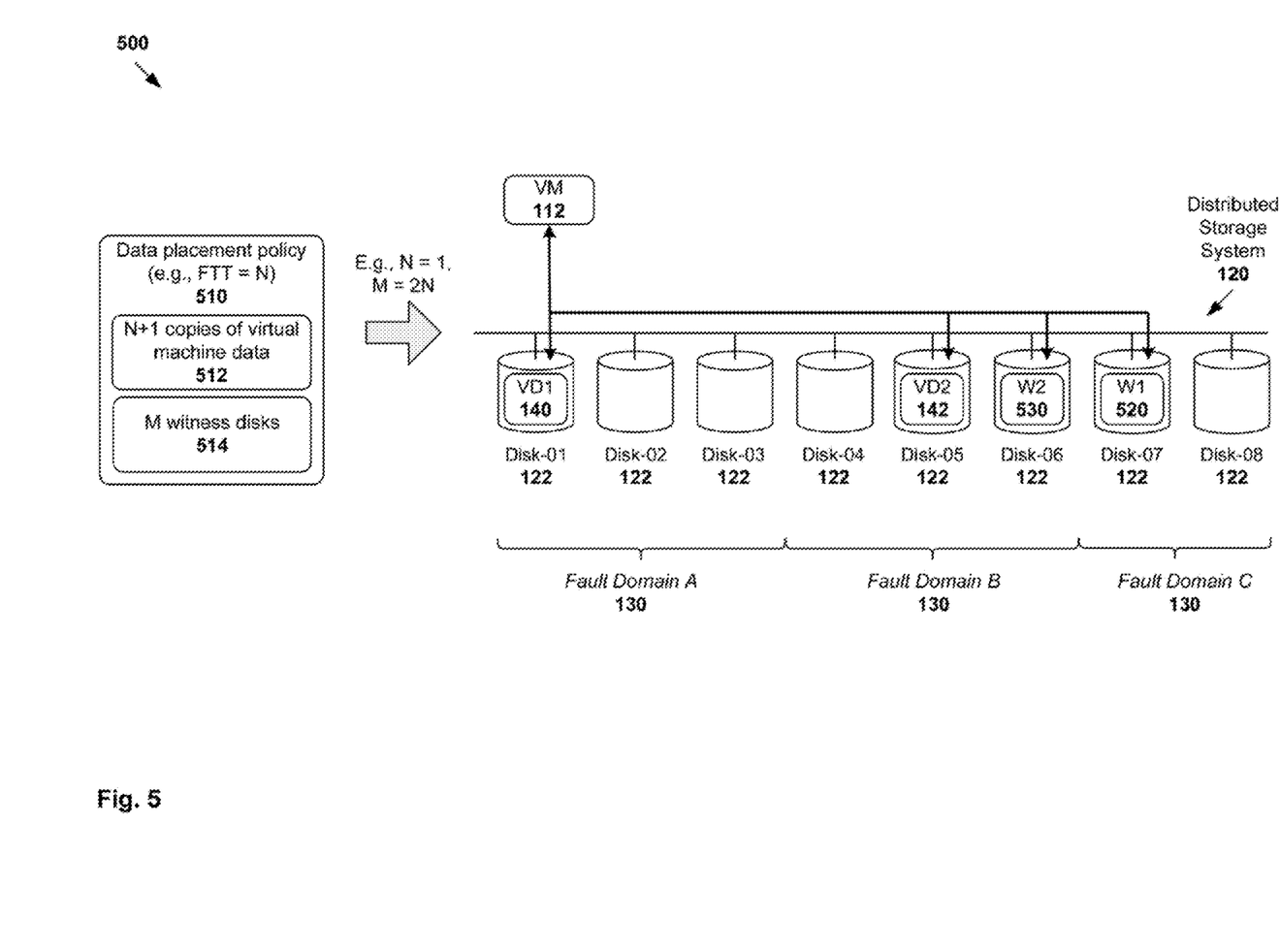
FIG. 5 is a schematic diagram illustrating example data placement policy for virtual machine data placement.

In some examples, a data placement policy may be used. In more detail, FIG. 5 is a schematic diagram illustrating example data placement policy 510 for virtual machine data placement. For example, a number of failures to tolerate (FTT) may be defined to set the number of failures the virtual machine data can tolerate. Although an example is shown in FIG. 5, data placement policy 510 may include any additional and/or alternative requirement relating to the performance and availability of distributed storage system 120, etc.

For example, for FTT=N failures tolerated (N≥1), a total of 2N+1 hosts are required to place N+1 copies of the virtual machine data and N witness disk(s). Here, the term "Witness disk" may refer generally to a component that acts as a tiebreaker whenever decisions have to be made in cluster 105. Each witness disk generally contains metadata that requires less storage space than each copy of virtual machine data.

In the case of N=1, three hosts are required to place two copies of the virtual machine data and one witness disk. In the example in FIG. 1, first copy 140 (e.g., "VD1") may be placed on a first host (e.g., "Host-01" in "Fault Domain A") and second copy 142 (e.g., "VD2") on a second host (e.g., "Host-05" in "Fault Domain B"). Additionally, a witness disk (e.g., "W" 144) may be placed on a third host with storage resource 122 in a third domain (e.g., "Host-07" with "Disk-07" in "Fault Domain C"). When the first host (e.g., "Host-01") fails, the second host (e.g., "Host-05") and third host (e.g., "Host-07") may form a quorum or majority (i.e., two out of three) to keep distributed storage system 120 operating.

To further improve the fault tolerance and resiliency of distributed storage system 120, the number of witness disks may be increased for additional redundancy. For example in FIG. 5, data placement policy 510 may require a total of (N+1)+M hosts to place N+1 copies of the virtual machine data and M>1 witness disks. For example, when N=1 and M=2N=2, two witness disks are placed in different fault domains 130 (instead of one witness disk 144 in FIG. 1).

In the example in FIG. 5, first witness disk 520 labelled "W1" may be placed on "Host-07" with "Disk-07" in "Fault Domain C", and second witness disk 530 labelled "W2" on "Host-06" with "Disk-06" in "Fault Domain B". Even when one witness disk fails (e.g., "W1" 530), another witness disk (e.g., "W2" 520) may act as a tiebreaker. Similarly for N=2, three copies (i.e., N+1=3) of virtual machine data and four witness disks (i.e., M=2×2) will be placed on distributed storage system 120. In this case, two witness disks (e.g., "W1" and "W2") will provide redundancy for the other witness disks (e.g., "W3" and "W4"). Parameters N and M may be configured depending on the desired implementation. For example, N=2 may be configured for high availability, N=3 for mission critical applications, etc.

Figure 6:
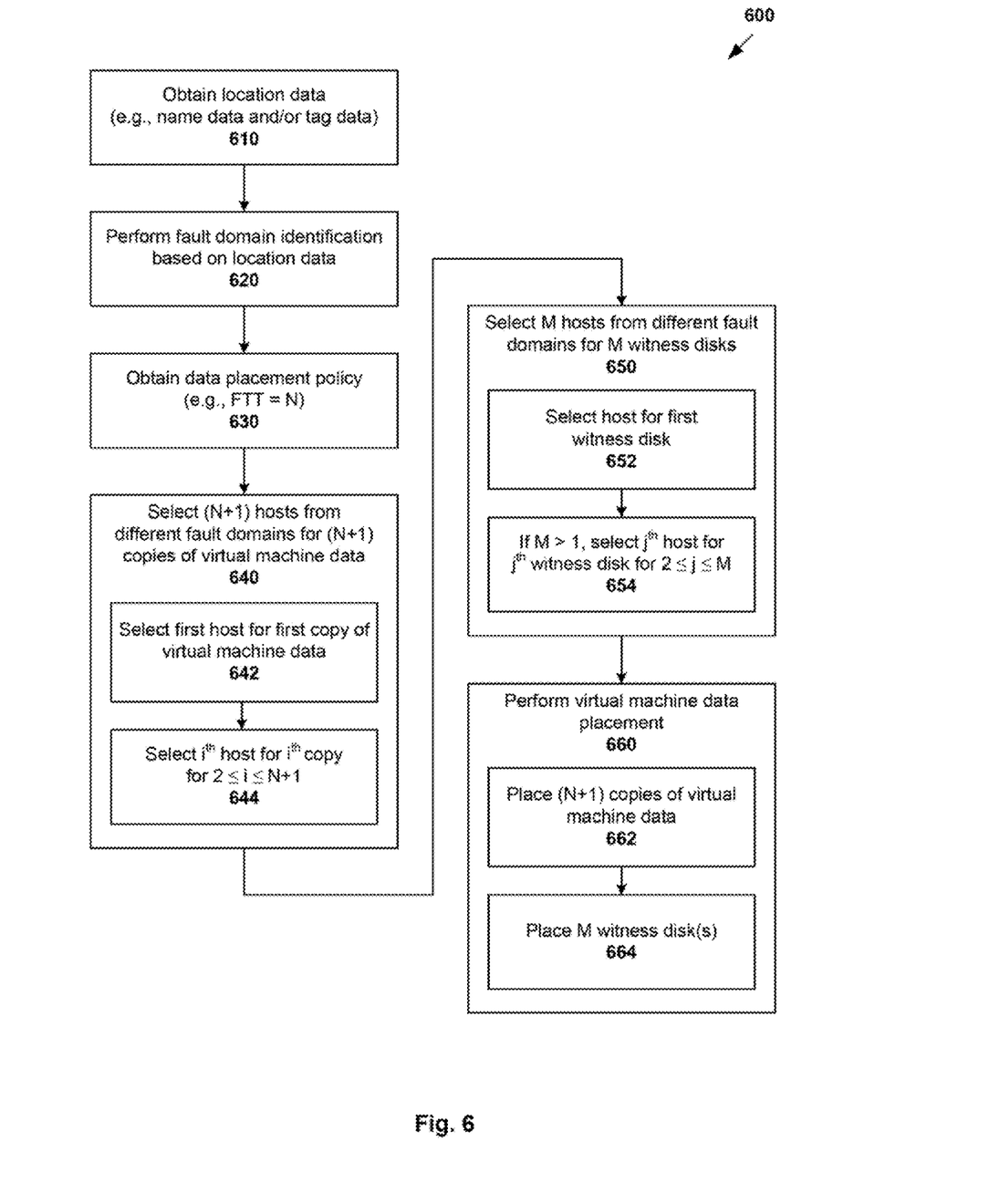
FIG. 6 is a flowchart of an example process for virtual machine data placement based on an example data placement policy.

In the following example in FIG. 6, M=2N will be used. However, it will be appreciated that M may be any suitable value depending on the desired implementation. FIG. 6 is a flowchart of example process 600 for virtual machine data placement based on example data placement policy 510. Example process 600 may include one or more operations, functions, or actions illustrated by one or more blocks, such as blocks 610 to 664. The various blocks may be combined into fewer blocks, divided into additional blocks, and/or eliminated based upon the desired implementation.

Similar to example process 200 in FIG. 2, example process 600 in FIG. 6 may be performed using any suitable computing system in virtualized computing environment 100, such as host 110 (e.g., distributed storage module 118), management entity 150 (e.g., distributed storage management module 152), a combination of host 110 and management entity 150, or any alternative or additional component, etc.

Fault domain identification at blocks 610 and 620 in FIG. 6 are related to block 210 in FIG. 2. At block 610, location data 300 is obtained from any suitable entity or storage. Here, the term "obtain" may include receiving (e.g., from management entity 150) or retrieving (e.g., from distributed storage system 120 or any other datastore) location data 300. At block 620, fault domain identification is performed based on location data 300, such as identifying fault domains 130 according to the examples in FIG. 4.

Host selection at blocks 630, 640, 642, 644, 650, 652 and 654 in FIG. 6 are related to blocks 220 and 230 in FIG. 2. At block 630, data placement policy 510 is obtained to determine the number of hosts (e.g., N+1) required to place copies of virtual machine data, and the number of hosts (e.g., M=2N) required to place witness disks. Similarly, the term "obtain" may include receiving (e.g., from management entity 150) or retrieving (e.g., from distributed storage system 120 or any other datastore) data placement policy 510 for host selection.

In relation to virtual machine data, N+1 hosts from different fault domains are selected at block 640. First host 110 (e.g., "Host-01" with "Disk-01") is selected for first copy 140 (e.g., "VD1") at block 642, and at least one second host 110 (e.g., "Host-05" with "Disk-05") for second copy 142 (e.g., "VD2") at block 644. Block 644 may be generalized as selecting the $i^{th}$ host for the $i^{th}$ copy for $2 \leq i \leq N+1$ (e.g. second, third, etc.).

In relation to witness disks, M hosts with a total of M storage resources 122 from different fault domains 130 are selected at block 650. In the case of M=2, one host 110 (e.g., "Host-07" with "Disk-07") is selected for first witness disk 520 (e.g., "W1" in FIG. 5) at block 652, and another for second witness disk 530 (e.g., "W2" in FIG. 5) at block 654. Block 654 may be generalized as selecting the $j^{th}$ host for the $j^{th}$ witness disk for $2 \leq j \leq M$ (e.g., second witness disk, third, etc.).

In addition to selecting hosts 110 from different fault domains 110, hosts 110 may be selected at blocks 640, 642 and 644 based on any suitable performance requirement, such as round trip time, latency, distance, etc., between two hosts 110, etc. For example, after first host 110 (e.g., "Host-01" with "Disk-01") is selected for first copy 140 (e.g., "VD1") at block 642, second host 110 (e.g., "Host-05" with "Disk-05") may be selected based on its distance from first host 110 at block 644.

Similar to blocks 640, 642 and 644, the selection of hosts 110 for M witness disks may be based on any suitable performance requirement (e.g., round trip time, latency, distance, etc.) between two hosts 110. For example, after "Host-07" with "Disk-07" is selected for first witness 520 (e.g., "W1") at block 652, "Host-06" with "Disk-06" may be selected based on its distance from "Host-07" at block 654.

Virtual machine data placement at blocks 660, 662 and 664 in FIG. 6 are related to blocks 240 and 250 in FIG. 2. At blocks 660 and 662, N+1 copies of virtual machine data may be placed on hosts 110 selected at blocks 640, 642 and 644 according to data placement policy 510 (e.g., FTT=N). At block 664, M witness disks may be placed on hosts 110 selected at blocks 650, 652 and 654. See the example in FIG. 5 again.

Any suitable mechanism may be used to keep the integrity between the M witness disks alive. For example, a heartbeat mechanism may be implemented where the witness disks inform each other of their status (e.g., active or inactive). In the example in FIG. 5, first witness 520 (e.g., "W1") may send a heartbeat message to second witness 530 (e.g., "W2") for response. A response message indicates that second witness 530 (e.g., "W2") is still available. Otherwise, if there is no response for a period of time, first witness 520 (e.g., "W1") may determine that second witness 530 (e.g., "W2") is unavailable and act as the tiebreaker.

Computing System

Figure 7:
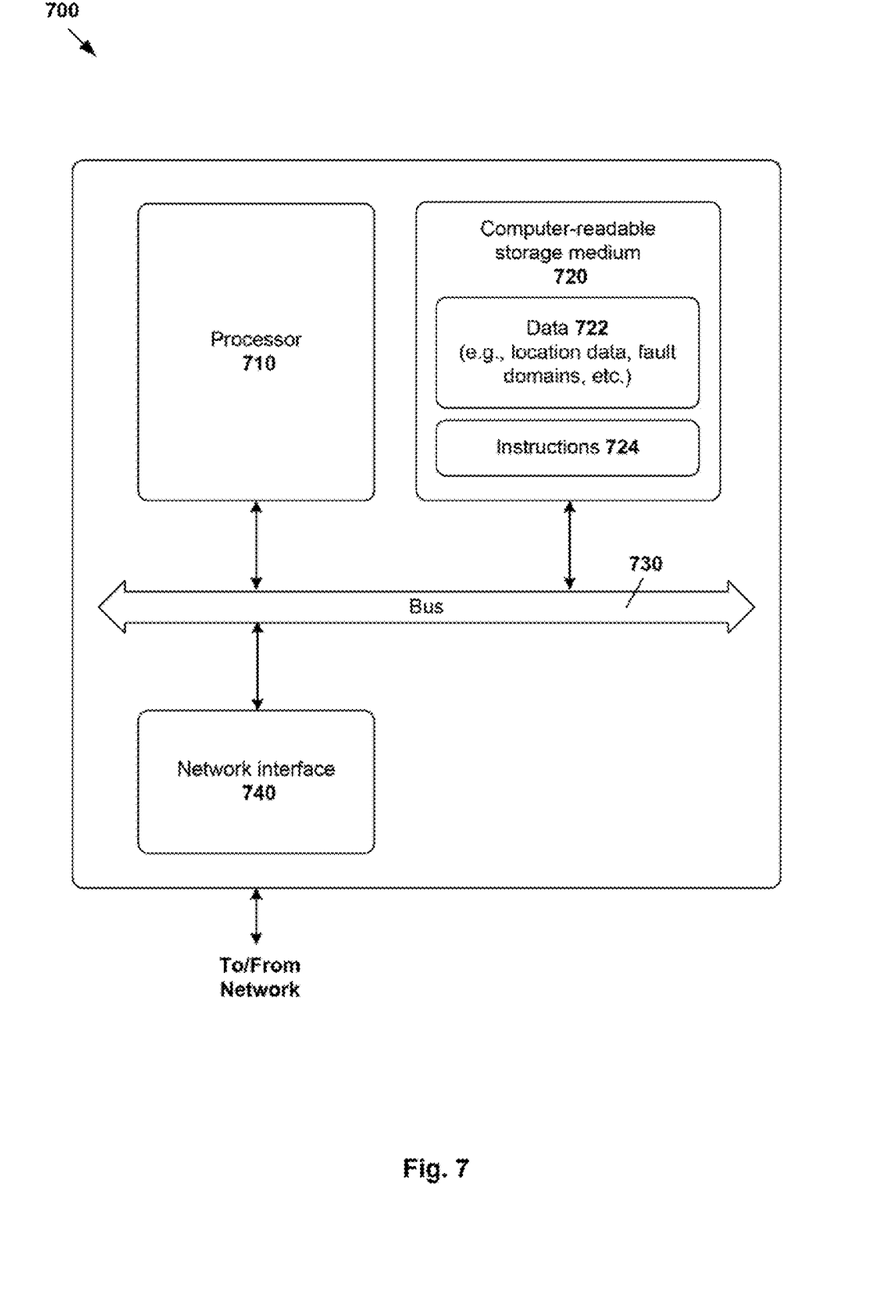
FIG. 7 is a schematic diagram illustrating an example computing system for virtual machine data placement in a virtualized computing environment.

The above examples can be implemented by hardware, software or firmware or a combination thereof. FIG. 7 is a schematic diagram of an example computing system 700 for virtual machine data placement on distributed storage system 120 accessible by cluster 105 in virtualized computing environment 100. Example computing system 700 (e.g., host 110, management entity 150, etc.) may include processor 710, computer-readable storage medium 720, network interface 740 (e.g., network interface card (NIC)), and bus 730 that facilitates communication among these illustrated components and other components.

Processor 710 is to perform processes described herein with reference to FIG. 1 to FIG. 6. Computer-readable storage medium 720 may store any suitable data 722, such as location data 300 (e.g., name data 310 and/or tag data 320), data relating to fault domains 130 identified from location data 300, etc. Computer-readable storage medium 720 may further store computer-readable instructions 724 which, in response to execution by processor 710, cause processor 710 to perform processes described herein with reference to FIG. 1 to FIG. 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method to perform virtual machine data placement on a distributed storage system accessible by a cluster in a virtualized computing environment, the method comprising:
   based on location data relating to the cluster, identifying a first fault domain, a second fault domain, and a third fault domain of the distributed storage system;
   selecting a first host with a first storage resource from the first fault domain, a second host with a second storage resource from the second fault domain, and a third host with a third storage resource from the third fault domain; and placing a first copy of the virtual machine data on the first storage resource, a second copy of the virtual machine data on the second storage resource, and a witness disk on the third storage resource, wherein the witness disk contains metadata that requires less storage space than any of the first copy of the virtual machine data and the second copy of the virtual machine data.

2. The method of claim 1, wherein identifying the first fault domain and second fault domain comprises:

determining a first physical location of the first host and a second physical location of the second host to identify the first fault domain and second fault domain.

3. The method of claim 2, wherein the first physical location or the second physical location represents a chassis, rack, pod, datacentre, room, floor, building, or any combination thereof.

4. The method of claim 3, wherein the location data comprises name data that identifies the first physical location and second physical location according to a naming convention.

5. The method of claim 3, wherein the location data comprises tag data that identifies the first physical location and second physical location using tag categories and tag values.

6. The method of claim 2, wherein identifying the first fault domain and second fault domain comprises:

determining a tree structure that represents the first physical location and second physical location within a physical layout of the cluster; and based on the tree structure, identifying the first fault domain and second fault domain.

7. The method of claim 1, wherein selecting the second host comprises:

selecting the second host from the second fault domain based on a performance requirement associated with the first host and the second host.

8. The method of claim 1, wherein the performance requirement is associated with a round trip time, latency or distance between the first host and the second host.

9. The method of claim 1, wherein placing the first copy of virtual machine data and second copy of virtual machine data comprises:

obtaining a data placement policy that defines a number of failures to tolerate (FTT) to be N, a number of copies of virtual machine data to be N+1, and a number of witness disks to be M=2N.

10. The method of claim 9, further comprising based on the data placement policy:

based on the location data, identifying M fault domains of the distributed storage resource;

selecting M hosts with a total of M storage resources from the M fault domains; and placing M witness disks on the M storage resources of the M hosts.

11. A non-transitory computer-readable storage medium that includes a set of instructions which, in response to execution by a processor of a computing system, causes the processor to perform a method for virtual machine data placement on a distributed storage system accessible by a cluster in a virtualized computing environment, the method comprising the computing system:

based on location data relating to the cluster, identifying a first fault domain, a second fault domain, and a third fault domain of the distributed storage system;

selecting a first host with a first storage resource from the first fault domain, a second host with a second storage resource from the second fault domain, and a third host with a third storage resource from the third fault domain; and placing a first copy of the virtual machine data on the first storage resource, a second copy of the virtual machine data on the second storage resource, and a witness disk on the third storage resource, wherein the witness disk contains metadata that requires less storage space than any of the first copy of the virtual machine data and the second copy of the virtual machine data.

12. The non-transitory computer-readable storage medium of claim 11, wherein identifying the first fault domain and second fault domain comprises:

determining a first physical location of the first host and a second physical location of the second host to identify the first fault domain and second fault domain.

13. The non-transitory computer-readable storage medium of claim 12, wherein the first physical location or the second physical location represents a chassis, rack, pod, datacentre, room, floor, building, or any combination thereof.

14. The non-transitory computer-readable storage medium of claim 13, wherein the location data comprises one or more of the following:

name data that identifies the first physical location and second physical location according to a naming convention; and tag data that identifies the first physical location and second physical location using tag categories and tag values.

15. The non-transitory computer-readable storage medium of claim 12, wherein identifying the first fault domain and second fault domain comprises:

determining a tree structure that represents the first physical location and second physical location within a physical layout of the cluster; and based on the tree structure, identifying the first fault domain and second fault domain.

16. The non-transitory computer-readable storage medium of claim 11, wherein selecting the second host comprises:

selecting the second host from the second fault domain based on a performance requirement associated with the first host and the second host.

17. The non-transitory computer-readable storage medium of claim 11, wherein the performance requirement is associated with a round trip time, latency or distance between the first host and the second host.

18. The non-transitory computer-readable storage medium of claim 11, wherein placing the first copy of virtual machine data and second copy of virtual machine data comprises:

obtaining a data placement policy that defines a number of failures to tolerate (FTT) to be N, a number of copies of virtual machine data to be N+1, and a number of witness disks to be M=2N.

19. The non-transitory computer-readable storage medium of claim 18, further comprising based on the data placement policy:

based on the location data, identifying M fault domains of the distributed storage resource;

selecting M hosts with a total of M storage resources from the M fault domains; and placing M witness disks on the M storage resources of the M hosts.

20. A computing system for virtual machine data placement on a distributed storage system accessible by a cluster in a virtualized computing environment, wherein the computing system comprises:
- a processor; and
- a non-transitory computer-readable storage medium storing instructions that, when executed by the processor, cause the processor to:
    - based on location data relating to the cluster, identify a first fault domain, a second fault domain, and a third fault domain of the distributed storage system;
    - select a first host with a first storage resource from the first fault domain, a second host with a second storage resource from the second fault domain, and a third host with a third storage resource from the third fault domain; and
    - place a first copy of the virtual machine data on the first storage resource, a second copy of the virtual machine data on the second storage resource, and a witness disk on the third storage resource, wherein the witness disk contains metadata that requires less storage space than any of the first copy of the virtual machine data and the second copy of the virtual machine data.

* * * * *